Aug. 18, 1942.   H. C. DOBBS   2,293,456
BALANCE STAFF
Filed Dec. 10, 1938   2 Sheets-Sheet 1

INVENTOR.
HENRY CLOYD DOBBS
BY James M. Heitman
ATTORNEYS.

Aug. 18, 1942.  H. C. DOBBS  2,293,456
BALANCE STAFF
Filed Dec. 10, 1938  2 Sheets-Sheet 2

INVENTOR.
HENRY CLOYD DOBBS
BY James M. Heilman
ATTORNEYS.

Patented Aug. 18, 1942

2,293,456

UNITED STATES PATENT OFFICE 2,293,456

BALANCE STAFF

Henry Cloyd Dobbs, Lancaster, Pa., assignor to Hamilton Watch Company, Lancaster, Pa.

Application December 10, 1938, Serial No. 244,899

10 Claims. (Cl. 58—140)

The object of this invention is to provide a means and a method for expeditiously securing various elements together, and also to provide a means and a method for readily disassembling the elements by mutilating only one of them.

A second object of this invention is to provide a means and a method whereby wheels or gears may be securely attached to shafts or staffs, while at the same time being capable of ready detachment therefrom.

Another object of this invention is to provide a means and a method in the instrument field, and particularly in the watch and clock industry whereby the balance wheel may be securely fastened to the balance staff, and still be capable of being readily detached therefrom without being damaged.

My invention has been illustrated and will be described as applied in the instrument, watch and clock industry. However, it should be clearly understood that this invention may be utilized whenever two or more elements are to be fastened together.

The main advantage of this invention lies in the fact that after the elements have been fastened together they may be readily separated; and separated in such a manner that only one of the elements is damaged. However, this invention may be used where the elements are permanently assembled for in addition to the removable feature, means have also been provided for a quick and efficient assembly operation. The invention may be readily understood by referring to the attached drawings in which.

Figure 1:
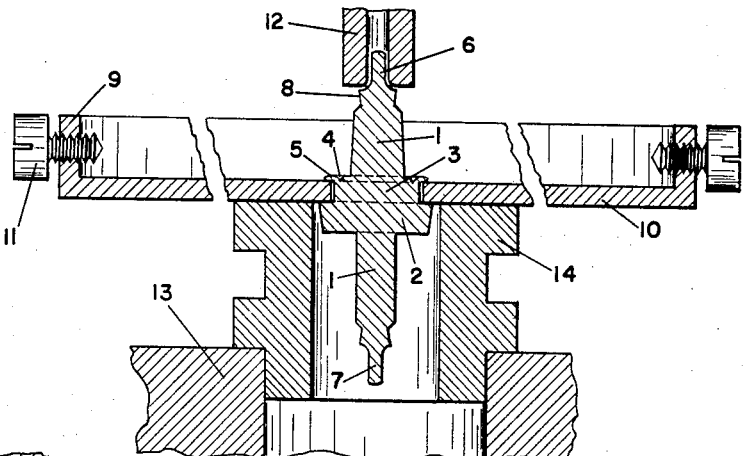
Fig. 1 illustrates my new improved balance staff being disassembled by means of a punch and stump.

Prior to my invention, the staking shoulder, illustrated by numeral 3 in Fig. 1, was made slightly thicker than the arm 10 of the balance wheel 9, and by means of sheer pressure on the upper edge of this shoulder, the metal was forced to flow outwardly over the apertured arm 10 of the balance wheel and thus securely fasten the arm to the hub 2. This swaging operation was done by means of a punch, similar to punch 12, but having a larger circular opening so that the punch was able to fit over the upper portion of the staff 1 and bear on the outer edge of the shoulder. Another method of attaching the balance wheel to the staff or shaft was to roll the staking shoulder by means of a rotating arm carrying a hardened circular disc in a vertical position which is free to roll on its shaft and thereby force the staking shoulder onto the balance wheel arm. However, pressure on the upper end of the staking shoulder had a tendency to, and quite often did, cause the metal in the shoulder not only to flow outwardly over the balance wheel arm, but also to flow in a general uncontrollable downwardly and outwardly direction, thereby destroying the concentricity of the aperture existing in the balance wheel arm.

In a watch the balance staff is frequently broken and has to be replaced. The relative heavy weight of the balance wheel in comparison with the thinness of the balance staff pivots is one of the main causes of this breakage.

The balance wheel together with its gold screws is one of the most expensive pieces in a watch and therefore, it is not practical to throw it away when the balance staff is broken and substitute a new balance wheel. Likewise the gold screws cannot be withdrawn and inserted into a new balance wheel without again poising and again trueing the balance and readjusting the hair spring for the new balance. Therefore, watchmakers, in order to avoid this additional expenditure, attempt to use again the more or less impaired and, hence, possibly defective balance wheel on the new staff.

The procedure for removing a balance wheel from a broken staff is to place the upper end of the staff in a chuck and by means of a graver or cutter to gradually cut down the hub 2 until it is smaller than the staking shoulder 3. Then the upper or collet end of the staff is placed in a stump, such as seen at 14, Fig. 1, and by gently tapping a punch, such as seen at 12, Fig. 1, which is applied to the lower end of the staff, the staff is detached from the balance wheel.

As is readily apparent, the above method is long and tedious, and does not insure that the balance wheel can be used again for the balance arm may have been distorted during the assembling operation.

This invention is adapted to overcome the above mentioned difficulties and is concerned with cutting a groove in the upper face of the staking shoulder 3 entirely around staff 1 so that when a flat or curved end staking punch or roll is positioned on the staking shoulder and is gently tapped or rolled, the metal will fold, flow, or roll over onto the arm of the balance wheel and securely hold it in place on the hub. When the groove is first cut in the staking shoulder, the metal in the area surrounding the grooved portion is considerably weakened. This weakness is particularly noticeable at the apex of the groove and has a tendency to follow a general line drawn from one side of the groove outwardly toward the periphery of the staking shoulder. At the time the shoulder is swaged upon the upper portion of the balance wheel arm, photomicrographs of many test experiments show that pronounced cracks and fissures appear throughout the previously weakened area. These fissures extend generally from the apex of the groove toward the lower edge of the staked or rolled over flange or rim of the staking shoulder. Consequently, when it is desired to remove the balance wheel from the staff, the assembly is placed in a stump as shown at 14 and by a very light pressure on the punch 12, the burr or flange 5 readily breaks off. The balance wheel is then lifted off the hub.

Balance wheels assembled and disassembled in this manner may be reused with the assurance that no damage has been done to them and that they are 100% perfect. For example, in actual tests which have been conducted, it has been determined that the aperture in the balance arm quite often will not increase a measurable amount in diameter, and that the greatest increase has been not over .0002 of an inch, that is, the diameter of the aperture has increased from its original diameter of .0318 inch to .0319 inch, and in certain instances to .0320 inch. Remarkable results have also been achieved in regard to the balance wheel remaining in true. In many cases the balance was true in both the flat position and also in the round position. Even in those cases where trueing was again necessary, the amount the balance was out of true was very slight. It was found that the balance was more often out of true in the flat, and rarely in the round.

From the foregoing description no lengthy explanation of the drawings appears necessary For convenience, all the drawings illustrate a balance wheel for a watch although I do not intend to so limit my protection, but intend to cover my invention as broadly as the prior art will permit.

Fig. 1 shows an assembled balance wheel and staff which is in the process of being disassembled. The balance staff or shaft 1 has a hub 2 and a staking shoulder 3, all of which are circular in form. On the upper end of the staking shoulder 3 is formed a groove 4, leaving a small area of uncut metal 5 between the groove and the vertical wall of the shoulder. This portion 5 of the shoulder is later rolled or staked over to form a flange or rim over the aperture in the arm 10 of the balance wheel 9 which carries the balance and timing screws 11.

The staff is provided with an upper pivot 6 and a lower pivot 7 which oscillates or vibrates in the jewels of a watch. Between the pivots and the staff proper is an undercutting 8 which provides an oil groove.

In assembling the balance wheel on the staff, a flat or curved end staking punch as described previously is used.

When the pivots have become bent or damaged and it is desired to detach the balance from the staff, the lower or roller end of the staff and pivot 7 is inserted into a stump 14 positioned in a staking stand base 13 and a punch 12 placed against the enlarged cone of the upper pivot. By applying a very slight tapping pressure to the punch, the fissures which were produced in the shoulder when the staking was done will readily continue toward the lower edge of the flange 5 and the flange will fall away from the shoulder 3.

Figure 2:
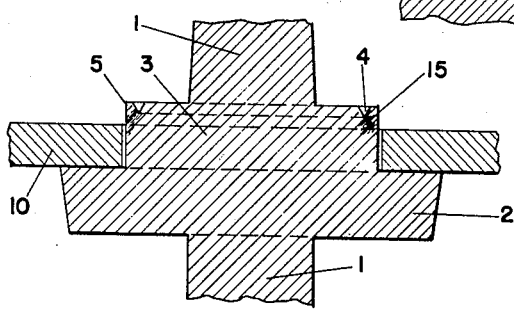
Fig. 2 is an enlarged detailed view of a balance staff immediately after the balance wheel is placed on the staff and before the staking, swaging or rolling operation.

Fig. 2 is an enlarged detailed view of Fig. 1 after the balance arm 10 has been placed on the hub 2, and before the staking shoulder has been rolled or staked over onto the balance arm 10. The weakened crystalline structure at the bottom of the groove caused by the cutting operation is indicated by numeral 15.

Figure 3:
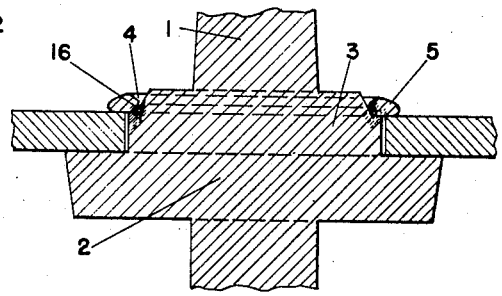
Fig. 3 is an enlarged detailed view of a portion of Fig. 1 after the staking shoulder has been swaged or rolled over the apertured balance arm.

Fig. 3 is a detailed sectional view of Fig. 1 after the edge of the balance arm has been staked to the staff. Numeral 16 illustrates how various fissures and cracks develop in the weakened structure and as a general rule run in the same direction as the pressure which has been applied by the punch, namely, toward the top corner of the balance arm.

Figure 4:
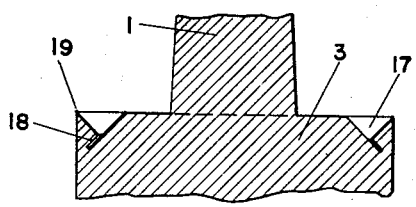
Fig. 4 is an enlarged view of a portion of a balance staff showing a modified groove in the staking shoulder before a staking punch or roll has burred or rolled over the edge of the shoulder.

Figs. 4 to 12 illustrate various modified types of grooves in the staking shoulder, for example;

Fig. 4 illustrates a V cut having sides of equal slope. This groove 17 has at its lowermost portion an outwardly directed auxiliary slot 18, and a more or less sharp point 19 is formed between the side of the groove and the side of the staking shoulder. The purpose of the slot 18 is to facilitate the breaking off of the subsequently formed flange when disassembly is necessary.

Figure 5:
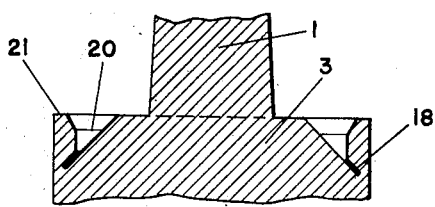
Fig. 5 is a view similar to Fig. 4 showing a different type of groove in the staking shoulder.

Fig. 5 illustrates a groove 20 having one side formed in a straight line and the other side formed by a combination of a vertical and a sloping line formation. This modification is also illustrated with a slot 18 and has a blunt end projection 21 which is adapted to be bent over the balance arm.

Figure 6:
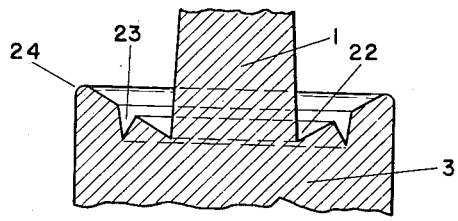
Fig. 6 shows another modification.

Fig. 6 illustrates a groove 22 which is formed in a straight line from the staff to the side of the staking shoulder at which place it merges with a curved end 24. Within this groove 22 there is also provided an additional undercutting 23 as clearly illustrated in Fig. 6. If desired, an auxiliary slot may be cut in the bottom of the undercutting 23.

Figure 7:
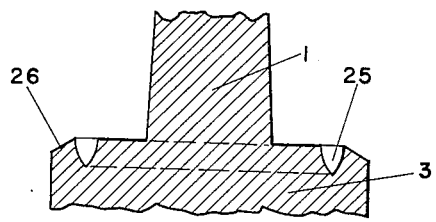
Fig. 7 shows still another modified groove.

Fig. 7 illustrates a groove 25 formed of two curved side portions which merge into a slightly pointed bottom. This modification is formed with a downwardly sloping blunt end portion 26.

Figure 8:
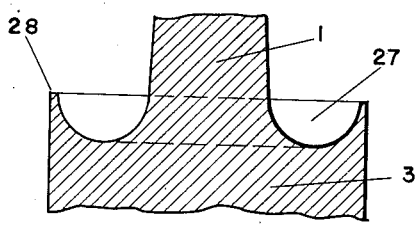
Fig. 8 shows another modification.

Fig. 8 shows a semi-circular groove 27 which merges into a blunt end portion 28.

Figure 9:
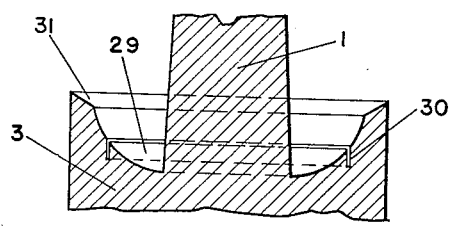
Fig. 9 illustrates a further modification.

Fig. 9 illustrates a groove 29 having a vertical slot 30 therein and merging into an upwardly sloping end portion 31.

Figure 10:
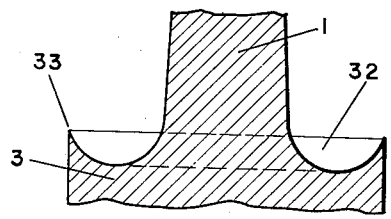
Fig. 10 shows another modification.

Fig. 10 illustrates a curved groove 32 which merges into a point 33 at the junction of the groove and the side of the staking shoulder.

Figure 11:
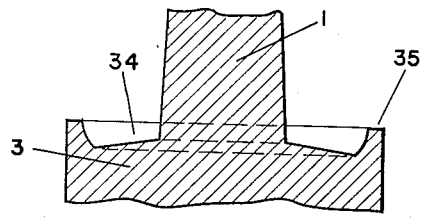
Fig. 11 shows another modification.

Fig. 11 shows a groove 34 one of which sides is of a straight line formation and the other of which is of curved formation and which merges with a blunt end 35.

Figure 12:
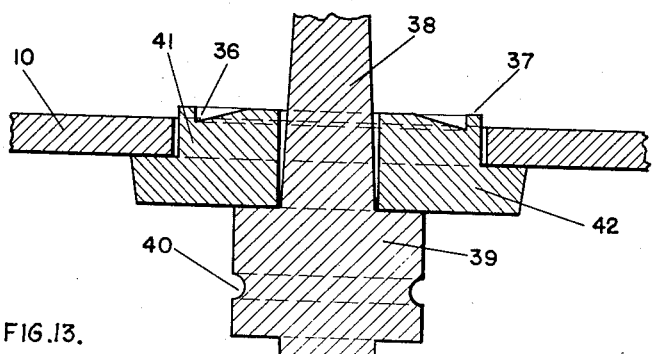
Fig. 12 shows another modified type of groove in a two-piece balance staff.

Fig. 12 illustrates a groove 36 formed with a sloping side and a vertical side which merges into a blunt end portion 37. In addition there is also disclosed in Fig. 12 another variation of my invention, i. e., a two-piece balance staff. The shoulder 41 and hub 42 are fastened friction tight to the staff 38 and rest on an enlarged stop 39 which is formed with an identification groove 40. Ordinarily the hub can be easily detached from the staff by the pressure of a punch against it, but sometimes the hub will be frozen on the balance staff and can not be released unless an excessive amount of pressure is applied. In order to overcome this difficulty and to add as a safety measure, it is contemplated to form a groove, such as shown at 36, in the staking shoulder 41.

The two-piece staff may be used either with or without any of the grooves disclosed in this application. The groove 40 is merely for the purpose of differentiating the two-piece balance staff from the conventional one-piece staff.

Figure 13:
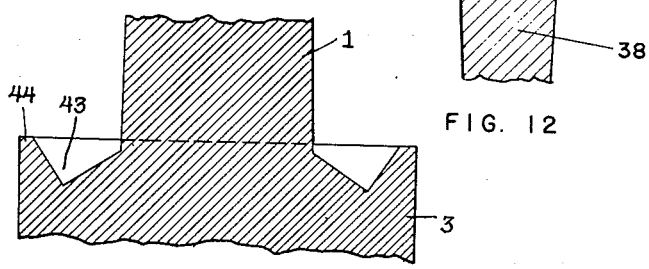
Fig. 13 shows another modified type of groove in a one piece staff.

Fig. 13 shows a groove 43, both of which sides are of a straight line formation, and which groove merges with a blunt end 44.

Fig. 1 illustrates a monometallic solid balance wheel although a bimetallic wheel could be readily used. Some of the modifications have been shown with pointed edge portions, while others have been shown with rounded or blunt edge portions. Also some of the grooves have been shown with straight line sides, while others have been illustrated with curved sides. It is within the scope of this invention to apply to the upper face of the staking shoulder various combinations of the features disclosed in these modifications together; for example, the groove 20 shown in Fig. 5 is readily adapted to be used with a downwardly sloping blunt edge portion such as shown at 26 in Fig. 7. Also the particular direction and location of the slot such as 18 may be varied. The choice of the particular configuration for the upper end of the staking shoulder will quite often depend upon the kind and quality of the metal used in making the staff.

The groove preferably extends entirely around the staff 1. However, if desired the groove may consist of a series of short arc-like depressions.

What I claim is:

1. In a balance assembly, a staff having a staking shoulder and a hub, an arm of a balance wheel positioned on said hub, a groove in the staking shoulder to facilitate attachment and detachment of said balance arm, said groove being substantially V-shaped and so positioned as to form a sharp edge portion on said shoulder and a slot positioned in the bottom of the groove.

2. In a balance assembly, a staff having a staking shoulder and a hub, an arm of a balance wheel positioned on said hub, a groove in the staking shoulder to facilitate attachment and detachment of said balance arm, said groove being formed of a sloping straight formation on one side and a vertical and sloping formation on the other side, said groove having a slot in the bottom of said groove, and a flat edge on said shoulder.

3. A balance staff having a staking shoulder and a hub adapted to receive the arm of a balance wheel thereon, said staking shoulder having a V-shaped groove in its upper face which weakens the adjacent area, and a flat edge portion between said groove and the side of said shoulder to facilitate attachment and detachment of said balance arm.

4. An article of manufacture comprising a shaft having a shoulder, said shoulder having a V-shaped groove therein to form a flange on its upper face, said shoulder being of normal crystalline structure with the exception of a weakened crystalline area from the groove through the flange.

5. A balance staff having a staking shoulder and a hub adapted to receive the arm of a balance wheel thereon, said staking shoulder having a V-shaped groove and a blunt edge portion, the groove causing a weakened area in the base of the blunt edge portion of the otherwise sturdy staking shoulder.

6. In a balance assembly, a staff having a staking shoulder and a hub, said staff also having a weakened area, a balance wheel having an arm positioned on said hub, said staking shoulder having a groove in its upper face to facilitate attachment and detachment of said balance arm, said weakened area extending from the groove in said staking shoulder to its periphery, the inner side of the groove terminating at a point below the outer side of the groove and being of a straight line formation, and said staking shoulder also having a flat edge portion formed by the groove to secure the balance wheel on said shoulder as long as desired.

7. A member formed of crystalline structure having a small shoulder and a large shoulder, a second member resting on said large shoulder, said small shoulder having a V groove and a flange formed thereon, the crystalline structure of said member being regular throughout its area except that a weakened crystalline area is provided extending from the groove in said staking shoulder to the outer periphery of the staking shoulder.

8. A member for use in instruments comprising a shaft having a shoulder, a gear positioned on said shaft, said shoulder having a V groove in its upper face and an edge adapted to secure said gear to said shaft, said shoulder being connected to said edge through a weakened connection, said connection being so arranged and constructed that the edge of said shoulder may be readily broken off by breaking said connection by a break extending from the groove to the outer periphery of the shoulder.

9. A balance staff comprising a staking shoulder formed of crystalline structure having a flange thereon and a top groove therein, the groove in said shoulder being cut to a depth sufficient to form a flange adapted to be bent over, and the base of the flange being so weakened by the cutting of the groove and the bending over of the flange that it will readily break upon the re-application of force.

10. In a balance assembly, a staff having a staking shoulder and a hub, a balance wheel having an arm positioned on said hub, said staking shoulder having a substantially V-shaped groove in its upper face, the cutting of the V-shaped groove causing said staking shoulder to have a weakened area running from the groove to the periphery of said staking shoulder to facilitate attachment and detachment of said balance wheel.

HENRY CLOYD DOBBS.